United States Patent [19]

Camara et al.

[11] Patent Number: 4,997,414
[45] Date of Patent: Mar. 5, 1991

[54] TORQUE EQUALIZER FOR CONTRAROTARY SHAFTS

[76] Inventors: Alpha Camara; Philippe Reynaud, both of c/o F.I.Sciences, 48 Rue St. Sébastien, 06410 Biot, France

[21] Appl. No.: 254,941
[22] PCT Filed: Dec. 23, 1987
[86] PCT No.: PCT/FR87/00516
    § 371 Date: Oct. 31, 1988
    § 102(e) Date: Oct. 31, 1988
[87] PCT Pub. No.: WO88/05009
    PCT Pub. Date: Jul. 14, 1988

[30] Foreign Application Priority Data

Dec. 31, 1986 [FR] France ................ 86 18517

[51] Int. Cl.$^5$ ............................................. F16H 37/06
[52] U.S. Cl. ...................................... 475/330; 74/665 N
[58] Field of Search ............ 74/665 K, 665 L, 665 N, 74/665 GE, 799, 797, 801, 675; 475/330, 295

[56] References Cited

U.S. PATENT DOCUMENTS

| 2,228,638 | 1/1941 | Mercier ................... 74/801 |
| 2,480,806 | 8/1949 | Desmoulins ............. 74/799 |
| 2,522,443 | 9/1950 | Gaubatz et al. ......... 74/801 |
| 2,584,555 | 2/1952 | Cleave et al. ........... 74/675 X |
| 2,700,311 | 1/1955 | Bade ........................ 74/801 |
| 3,252,355 | 5/1966 | Hewko .................... 74/665 K |
| 3,454,098 | 7/1969 | Hillander et al. ....... 74/665 N |
| 3,507,113 | 4/1970 | Herrmann et al. ..... 74/675 X |
| 4,016,777 | 4/1977 | Ryzhkov et al. ........ 74/665 L X |
| 4,132,131 | 1/1979 | DeBruyne ............... 74/665 K X |

FOREIGN PATENT DOCUMENTS

| 1109847 | 2/1956 | France ..................... 74/675 |
| 61-6447 | 1/1986 | Japan ...................... 74/675 |

Primary Examiner—Dwight Diehl
Assistant Examiner—Ryan Massey
Attorney, Agent, or Firm—Pollock, Vande Sande & Priddy

[57] ABSTRACT

A mechanism based on a reduction gear assembly which produces two torques of equal intensity, both counter-rotational, applied to rotating shafts which may or may not be positioned coaxially. This torque force is achieved without transmitting any torque to the supporting structure. The mechanism comprises two reduction gearboxes with planetary gear trains consisting of internal planet gear wheels linked to the counter-rotating input shafts, satellite gear wheels, freely rotating on their planet pinion cage which is connected to the counter-rotating output shafts, as well as external planet gear wheels interlocked and hence constrained to rotate in the same direction, thereby balancing the torques by reducing speed on one output shaft and accelerating speed on the other shaft.

6 Claims, 2 Drawing Sheets

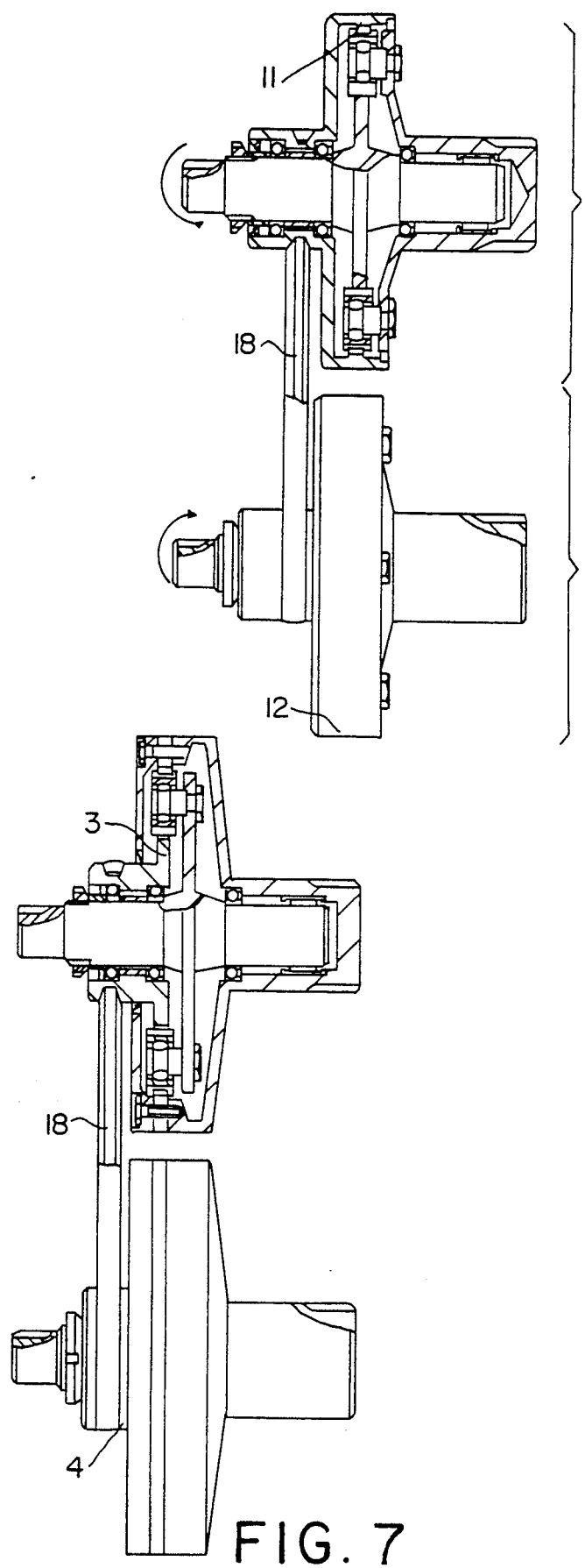
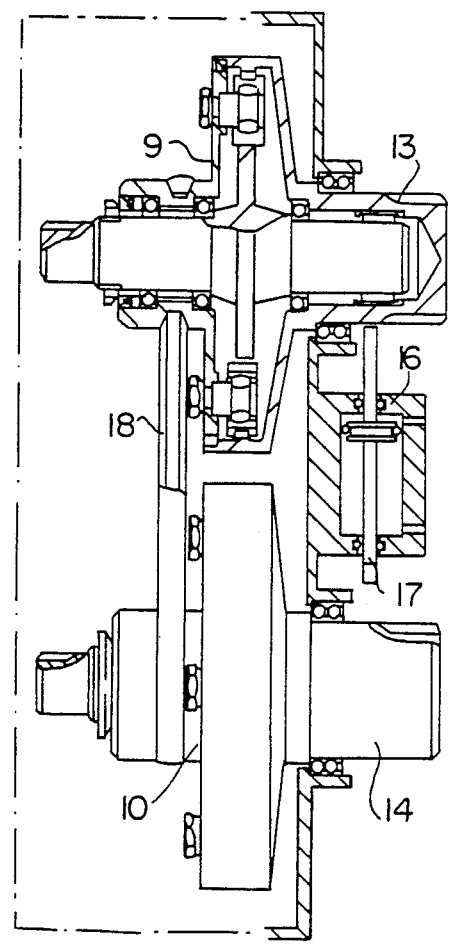
FIG. 5
FIG. 7
FIG. 6

TORQUE EQUALIZER FOR CONTRAROTARY SHAFTS

FIELD OF THE INVENTION

This invention relates to a torque equalizing unit which enables the two drive shafts connected to the mechanism to drive the counter-rotating propellers by supplying them with the same torque while at the same time adapting their rotational speed.

BACKGROUND OF THE INVENTION

Propeller are currently used to ensure propulsion and lift on machines themselves and in generators to convert the power output of a fluid into electrical energy.

The use of counter-rotating propellers has the advantage that they develop only a minimal reverse torque reaction on their supporting structure or frame, which is not the case for monopropeller machines.

The differences between two coaxial propellers are due to the fact that the kinematic fluid characteristics change for the downstream propeller with each passage of the upstream propeller. Until now, possible solutions for reducing the difference in torque between the two propeller wheel hubs were as follows:
independent control of blade pitch
different and predetermined rotational speeds
use of unequal diameters
spacing between rotational planes
appropriate choice of blade spin Such stopgap measures, employed separately or jointly, only serve to displace the problem of wheel hub torque to the engine itself by resorting to empirical solutions and complex mechanisms.

French Patent No. 1,497,099 describes (in its second part) a mechanism designed to automatically ensure balanced torque on counter-rotating propellers through the adaptation/application of a differential composed of one input and two output shafts, such as the type applied to automobile axles. In other words, it is composed of a conventional differential with conical pinons, of which one of the output shafts is inversed and co-axially aligned to the other shaft through a series of conical pinons wherein the fixation of the intermediate pinion is indispensable to the counter-rotative function of the second output shaft.

French Patent Application No. 2,406,565 describes the same mechanism, which comprises an input shaft perpendicular to the axis of the counter-rotating hub, and wherein the inversing transmission gears are either internal or external.

SUMMARY OF THE INVENTION

The invention covered by the following description provides basis constituents which ensure its operation as a counter-rotating reduction gear unit, and integrates the equalizing mechanism of the torque; this second effect is obtained through the linkage of two functional elements which are similar to the reduction gear assemblies: either the internal or external planetary units or the planet pinion cage.

More precisely, this invention concerns a torque equalizer for counter-rotating shafts of a type which incorporates two reduction gear assemblies: planetary coaxial gear trains composed of counter-rotating input shafts, with external planet gear wheels, planet pinions, planet pinion cages and counter-rotating output shafts. The invention is characterized by the fact that is external planet gear wheels are interlocked during rotation, thereby ensuring balanced torque on the output shafts connected to the planet pinion cages, the output shafts being linked to the internal planet gear unit.

In one embodiment, it is the planet pinion cages which are inter-locked during rotation, thus ensuring balanced torque on the counter-rotating output shafts connected to the external planet gear unit, the counter-rotating input shafts being linked to the internal plane gear unit.

In a second embodiment, it is the internal planet gear wheels which are interlocked during rotation, thereby ensuring balanced torque on the output shafts connected to the external planet gear unit, the input shafts being linked to the planet pinion cages.

Other variations on the same principle of torque equalizing on two parallel reduction units involve a system whereby the torques of the external planet gear wheels of the planet pinion cages and of the internal planet gear wheels, are constrained to rotate consecutively in the same direction through the use of a flexible linkage, such as a drive belt or a transmission chain.

It is an advantage if the couplings between the internal planet gear wheels or the external planet gear wheels or the planet pinion cages are accomplished by means for an elastomer with characteristic viscoelastic properties.

One of the aspects of the mechanism is that the output shafts of the torque equalizing system can serve as input shafts, resulting in balanced torque on the input shafts; this characteristic is preserved if the rotational sense of the input shafts is then simultaneously inversed.

Another advantage to this torque equalizer is that it functions satisfactorily with input shafts synchronized to rotational speed as well as with input shafts not so synchronized.

Advantageous as well is the fact that the torque equalizer includes brakes which act independently on one or the other of the output shafts by bracing themselves on the frame of the mechanism, thereby imposing on it a rotational direction counter to that of the braked output shaft.

BRIEF DESCRIPTION OF THE DRAWINGS

In order that the invention may be more clearly understood, it will now be described with reference to the accompanying drawings, wherein several embodiments of the invention are shown for purposes of illustration.

FIG. 5 shows the torque equalizer with parallel reduction assemblies, and wherein the external planet gear wheels are connected.

FIG. 6 shows the torque equalizer with parallel reduction assemblies, and wherein the planet pinion cages are connected.

FIG. 7 shows the torque equalizer with parallel reduction assemblies, and wherein the internal planet gear wheels are connected.

DESCRIPTION OF PREFERRED EMBODIMENT

Figure 1:
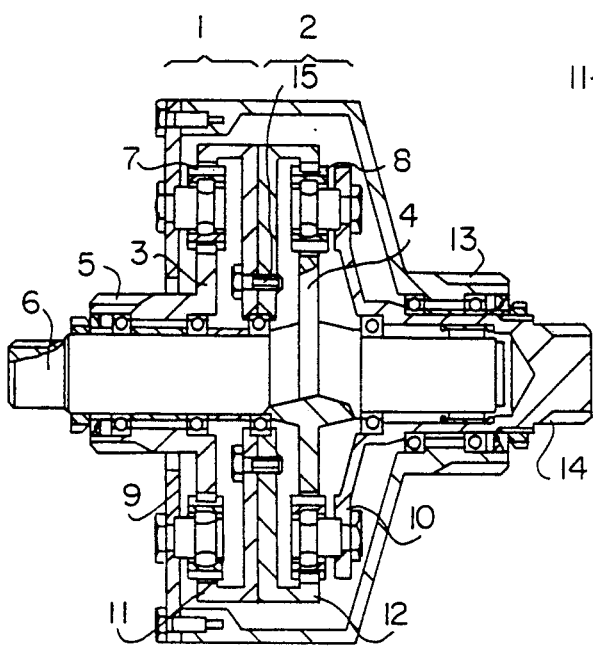
FIG. 1 shows the torque equalizer according to the invention with a coaxially-aligned reduction gearbox assembly, wherein the external planet gear wheels are interlocked.

FIG. 1 shows two coaxially aligned reduction gearbox assemblies with planetary gear trains 1 and 2, composed of internal planet gear wheels 3 and 4 connected to counter-rotating input shafts 5 and 6, of unattached planet pinions 7 and 8, freely rotating on their planet pinion cages 9 and 10 connected to counter-rotating output shafts 13 and 14, and of external planet gear wheels 11 and 12 meshed at point 15 and thereby constrained to rotate in the same direction.

Figure 2:
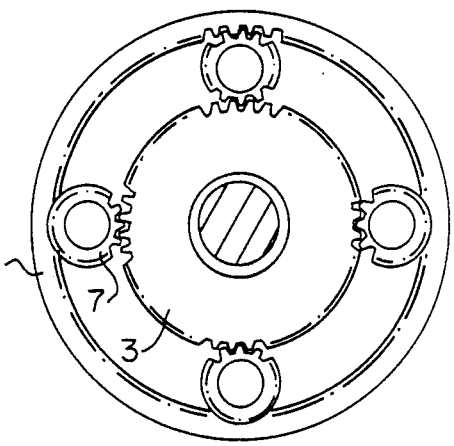
FIG. 2 shows the gear arrangement constituting the planetary gear train reduction gearbox assembly.

FIG. 2 shows the sprocketed gear wheels of a reduction unit with a planetary gear train, wherein the internal planet gear wheel is meshed with the planet pinions 7, which in turn mesh with the external planet gear wheel 11.

Figure 3:
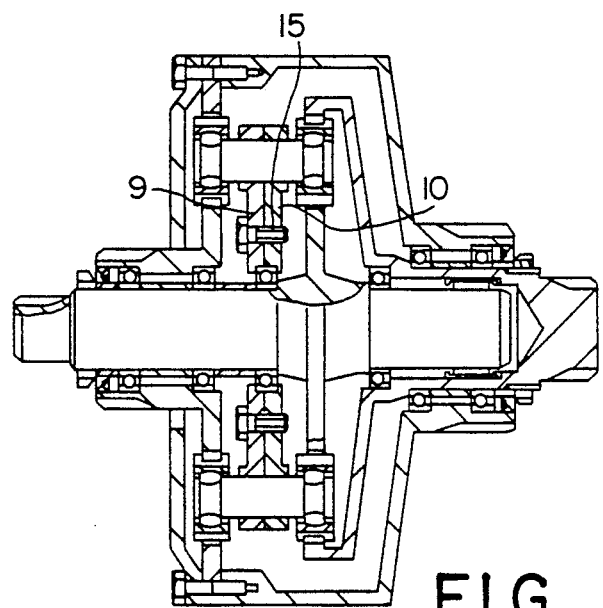
FIG. 3 shows the torque equalizer with coaxially-aligned reduction gearbox assembly, wherein the planet pinion cages are interlocked.

FIG. 3 shows a variant wherein it is the planet pinion cages 8 and 10 which are interlocked.

Figure 4:
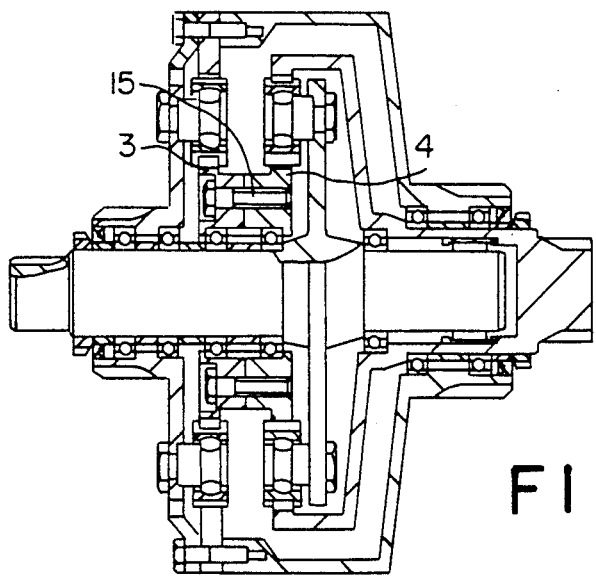
FIG. 4 shows the torque equalizer with coaxially-aligned reduction gearbox assembly, wherein the internal planet gear wheels are interlocked.

FIG. 4 shows a variant wherein it is the internal planet gear wheels 3 and 4 which are interlocked.

FIGS. 5 and 7, respectively, show variants wherein first the external planet gear wheels 11 and 12 and then the internal planet gear wheels 3 and 4 are constrained to rotate in the same direction by means of a flexible linkage 18 such as a drive belt or a transmission chain.

FIG. 6 shows a variant of the torque equalizer wherein the planet pinion cages 9 and 20 are interlocked during rotation by means of a flexible linkage 18. By way of example, this variant is affixed with a brake (17) braced on the mounting or frame and influencing either one or the other of output shafts 13 and 14.

The materials used in the manufacture of the torque equalizer are those conventionally employed in the production of reduction gear assemblies with planetary gear trains, e.g., steel alloys for the sprocketed gear wheels, ball-bearings, aluminum or cast iron alloys for the casings which house the mechanism. The teeth of the gears may be superficially reinforced by a "High Frequency" quench hardening process in order to increase its resistance to wear. The coupling of the internal planet gear wheels, the external planet gear wheels and the planet pinion cages can be accomplished by means of an elastomer with visco-elastic properties, capable of absorbing acoustic vibrations. A multiple-disk clutch may also be used, resetting of such clutch eliminating the risk of destruction of the mechanism in the event of shock against an output shaft.

The torque equalizer according to the invention accomplishes the following:

Installed in the helicopter rotor, this device can be independent of the anti-torque rotor and can thereby facilitate piloting of the machine.

Adapted to a turbo-propulsion device with counter-rotating propellers such as "Propfans", it contributes to eliminating "overturning moment torque", which may be conveyed to the cockpit; it contributes as well to reducing vibrations due to such torque.

Used on a wind-generated unit or on a hydraulic turbine during an energy convention process, it improves power output while at the same time eliminating torque conveyed to the structural framework.

We claim:

1. Torque equalizer for counter-rotating shafts of a type which incorporates two reduction gear units, with coaxially mounted planetary gear trains, comprising pairs of constituent elements including a pair of counter-rotating input shafts, a pair of internal planet gear wheels, a pair of external planet gear wheels, a pair of planet pinions freely rotatable in pinion cages, and a pair of counter-rotating output shafts adapted to absorb power supplied by said input shafts, wherein said external planet gear wheels are interlocked during rotation, thereby ensuring balanced torque on said output shafts, said output shafts being connected to said pinion cages.

2. Torque equalizer for counter-rotating shafts of a type which incorporates two reduction gear units, with coaxially mounted planetary gear trains, comprising pairs of constituent elements including a pair of counter-rotating input shafts, a pair of internal planet gear wheels, a pair of external planet gear wheels, a pair of planet pinions freely rotatable in pinion cages, and a pair of counter-rotating output shafts adapted to absorb power supplied by said input shafts, wherein said internal planetary gear wheels are interlocked during rotation, thereby ensuring balanced torque on said output shafts connected to said external planet gear wheels, said input shafts being connected to said planet pinion cages.

3. Torque equalizer for counter-rotating shafts of a type which incorporates two reduction gear units, with parallel planetary gear train assemblies, comprising pairs of constituent elements including a pair of counter-rotating input shafts, a pair of internal planet gear wheels, a pair of external planet gear wheels, a pair of planet pinions freely rotatable in pinion cages, and a pair of counter-rotating output shafts adapted to absorb power supplied by said input shafts, comprising parallel reduction gearbox assemblies, wherein torques on said external planet gear wheels of said planet pinion cages or on said internal planet gear wheels cause said external planet gears, said planet pinion cages and said internal planet gear wheels to rotate in a same rotational direction by means of a flexible linkage.

4. Torque equalizer according to claim 3, wherein said flexible linkage is a drive belt.

5. Torque equalizer according to claim 3, wherein said flexible linkage is a chain.

6. Torque equalizer according to any one of claims 1 to 3, wherein said output shafts are adapted to become input shafts by reversal of rotational direction of said torque equalizer.

* * * * *